United States Patent
Huang et al.

(10) Patent No.: US 9,778,768 B2
(45) Date of Patent: Oct. 3, 2017

(54) TOUCH DISPLAY SCREEN AND TIME DIVISION DRIVING METHOD THEREOF

(71) Applicants: BOE TECHNOLOGY GROUP CO., LTD., Beijing (CN); CHENGDU BOE OPTOELECTRONICS TECHNOLOGY CO., LTD., Sichuan (CN)

(72) Inventors: Weiyun Huang, Beijing (CN); Youngyik Ko, Beijing (CN); Xiangdan Dong, Beijing (CN)

(73) Assignees: BOE TECHNOLOGY GROUP CO., LTD., Beijing (CN); CHENGDU BOE OPTOELECTRONICS TECHNOLOGY CO.. LTD., Chengdu, Sichuan (CN)

( * ) Notice: Subject to any disclaimer, the term of this patent is extended or adjusted under 35 U.S.C. 154(b) by 368 days.

(21) Appl. No.: 14/436,928

(22) PCT Filed: Nov. 20, 2014

(86) PCT No.: PCT/CN2014/091732
§ 371 (c)(1),
(2) Date: Apr. 20, 2015

(87) PCT Pub. No.: WO2015/176511
PCT Pub. Date: Nov. 26, 2015

(65) Prior Publication Data
US 2016/0299587 A1     Oct. 13, 2016

(30) Foreign Application Priority Data
May 19, 2014   (CN) .......................... 2014 1 0211214

(51) Int. Cl.
G06F 3/041       (2006.01)

(52) U.S. Cl.
CPC ............ G06F 3/041 (2013.01); G06F 3/0412 (2013.01)

(58) Field of Classification Search
CPC ............................... G06F 3/041; G06F 3/0412
See application file for complete search history.

(56) References Cited

U.S. PATENT DOCUMENTS

| 5,838,289 A | 11/1998 | Saito et al. |
| 2004/0125046 A1* | 7/2004 | Yamazaki ................ G09G 3/20 345/1.3 |

(Continued)

FOREIGN PATENT DOCUMENTS

| CN | 103456259 A | 12/2013 |
| CN | 103489391 A | 1/2014 |

(Continued)

OTHER PUBLICATIONS

International Search Report dated Jan. 28, 2015 issued in corresponding International Application No. PCT/CN2014/091732.

(Continued)

*Primary Examiner* — Michael Pervan
*Assistant Examiner* — Andrew Lee
(74) *Attorney, Agent, or Firm* — Nath, Goldberg & Meyer; Joshua B. Goldberg; Stanley N. Protigal

(57) ABSTRACT

The present invention provides a time division driving method for touch display screen, comprising multiple driving periods. For any two adjacent driving periods, in a former driving period, the method comprises: S1, providing scanning signals to N scanning lines sequentially arranged; S2, stopping providing scanning signals, and providing touch driving signals to the touch display screen; in a latter driving period, the method comprises: S3, providing scanning signals to N scanning lines sequentially arranged; S4, stopping providing scanning signals, and providing touch (Continued)

driving signals to the touch display screen, wherein the first n scanning lines scanned in step S3 are the last n scanning lines scanned in step S1, both N and n are positive integers and N>n; and gray-level signals of the first n scanning lines scanned in step S3 are the same as those of the last n scanning lines scanned in step S1.

11 Claims, 3 Drawing Sheets

(56) References Cited

U.S. PATENT DOCUMENTS

| | | | |
|---|---|---|---|
| 2010/0066692 A1* | 3/2010 | Noguchi | G06F 3/0412 345/173 |
| 2013/0009856 A1 | 1/2013 | Takahashi et al. | |
| 2014/0049705 A1* | 2/2014 | Sugita | G06F 3/0416 349/12 |

FOREIGN PATENT DOCUMENTS

| | | |
|---|---|---|
| CN | 203444734 U | 2/2014 |
| CN | 203456069 U | 2/2014 |
| CN | 104049796 A | 9/2014 |

OTHER PUBLICATIONS

1st office action issued in corresponding Chinese application No. 201410211214.3 dated Jun. 20, 2016.

* cited by examiner

TOUCH DISPLAY SCREEN AND TIME DIVISION DRIVING METHOD THEREOF

This is a National Phase Application filed under 35 U.S.C. 371 as a national stage of PCT/CN2014/091732, filed Nov. 20, 2014, an application claiming the benefit of Chinese Application No. 201410211214.3, filed May 19, 2014, the content of each of which is hereby incorporated by reference in its entirety.

FIELD OF THE INVENTION

The present invention relates to the field of display technology, in particular to a touch display screen and a time division driving method for the touch display screen.

BACKGROUND OF THE INVENTION

With the popularization of smart phones, touch display screens have been widely applied. In driving a touch display screen, it is usually required to perform time division driving on the touch display screen. In other words, each driving period of the touch display screen includes a display stage in which a gate driver of the touch display screen provides scanning signals for scanning lines of the touch display screen and a touch stage in which a touch driver of the touch display screen provides touch driving signals for the touch display screen.

FIG. 1 shows a schematic diagram of a driving period of an existing touch display screen, where $T_{11}$ represents a display stage in a former driving period $T_1$, $T_{12}$ represents a touch stage of the former driving period $T_1$ and $T_{21}$ represents a display stage in a latter driving period. As shown in the figure, in the display stage $T_{11}$ of the former driving period, scanning lines numbered 1, 2, 3 and 4 are sequentially scanned; while in the display stage $T_{21}$ of the latter driving period, scanning lines numbered 5, 6, 7 and 8 are sequentially scanned.

However, by using the time division driving method shown in FIG. 1, the display of the touch display screen may be inconsecutive.

Therefore, how to improve the display continuity of a touch display screen driven by using a time division driving method becomes a technical problem to be urgently solved in the art.

SUMMARY OF THE INVENTION

An object of the present invention is to provide a touch display screen and a time division driving method for the touch display screen. When the touch display screen is driven by the time division driving method provided by the present invention, consecutively displayed pictures can be obtained.

To achieve the above object, as one aspect of the present invention, there is provided a time division driving method for a touch display screen, including a plurality of driving periods, for any two adjacent driving periods:

in a former driving period of the two adjacent driving periods, the time division driving method includes steps of:

S1: providing scanning signals to N scanning lines that are sequentially arranged in the touch display screen; and S2: stopping providing the scanning signals to an array substrate of the touch display screen, and providing touch driving signals to a touch module of the touch display screen;

in a latter driving period of the two adjacent driving periods, the time division driving method includes steps of:

S3; providing scanning signals to N scanning lines that are sequentially arranged in the touch display screen; and S4: stopping providing the scanning signals to the array substrate of the touch display screen, and providing touch driving signals to the touch module of the touch display screen, wherein the first n scanning lines among the N scanning lines scanned in step S3 are the last n scanning lines among the N scanning lines scanned in step S1, both N and n are positive integers and N>n; and gray-level signals of the first n scanning lines among the N scanning lines scanned in step S3 are the same as those of the last n scanning lines among the N scanning lines scanned in step S1 in one-to-one correspondence.

Preferably, N equals to 4 and n equals to 2.

As another aspect of the present invention, a touch display screen is provided, a driving period of the touch display screen includes a display stage and a touch stage, and the touch display screen includes:

a gate driving circuit, which includes a plurality of stages of cascaded shift register units, wherein in the display stage, N stages of shift register units are configured to provide scanning signals to N scanning lines of the touch display screen;

a source driving circuit, which is able to provide gray-level signals to data lines of the touch display screen in the display stage, and a rescanning circuit, which, in a predetermined time period before a latter driving period of any two adjacent driving periods begins, is able to pull potential of a pull-up node of the shift register unit corresponding to the (N-n+1)$^{th}$ scanning line among N scanning lines corresponding to a former driving period of the two adjacent driving periods up to a high level, and pull potential of a pull-up node of the shift register unit corresponding to the (n+1)$^{th}$ scanning line among N scanning lines corresponding to the latter driving period of the two adjacent driving periods down to a low level, so that for the two adjacent driving periods, the last n scanning lines among the N scanning lines scanned in the former driving period are the same as the first n scanning lines among the N scanning lines scanned in the latter driving period, where both N and n are positive integers and N>n, and the predetermined time period lasts till the latter driving period begins;

wherein, gray-level signals provided by the source driving circuit while scanning the last n scanning lines in the former driving period are the same as those provided by the source driving circuit while scanning the first n scanning lines in the latter driving period in one-to-one correspondence.

Preferably, N equals to 4 and n equals to 2.

Preferably, the rescanning circuit includes:

a rescanning signal source, configured to begin providing a control signal at a predetermined moment before the latter driving period of the two adjacent driving periods begins, wherein the control signal provided by the rescanning signal source lasts till the latter driving period begins; and a plurality of rescanning control modules, to one of which 2N-n scanning lines scanned in the two adjacent driving periods correspond, and each of which is connected to the rescanning signal source, wherein, when the rescanning signal source outputs the control signal, the rescanning control module outputs a high level to the pull-up node of the shift register unit corresponding to the (N-n+1)$^{th}$ scanning line among the N scanning lines scanned in the former driving period and pulls the potential of the pull-up node of the shift register unit corresponding to the $(n+1)^{th}$ scanning line among the N scanning lines scanned in the latter driving period down to a low level.

Preferably, each rescanning control module includes:

a first control unit, configured to output a high level to the pull-up node of the $(N-n+1)^{th}$ stage of shift register unit among the N stages of shift register units corresponding to the former driving period when the rescanning signal source provides the control signal; and a second control unit, configured to pull the potential of the pull-up node of the $(n+1)^{th}$ stage of shift register unit among the N stages of shift register units corresponding to the latter driving period down to a low level when the rescanning signal source provides the control signal.

Preferably, the first control unit includes a first thin film transistor, a gate of the first thin film transistor is connected to the rescanning signal source, a first electrode of the first thin film transistor is connected to a pull-up node of the last stage of shift register unit among the N stages of shift register units corresponding to the former driving period, and a second electrode of the first thin film transistor is connected to the pull-up node of the $(N-n+1)^{th}$ stage of shift register unit among the N stages of shift register units corresponding to the former driving period.

Preferably, the second control unit includes a second thin film transistor, a gate of the second thin film transistor is connected to the rescanning signal source, a first electrode of the second thin film transistor is connected to the pull-up node of the $(n+1)^{th}$ stage of shift register unit among the N stages of shift register units corresponding to the latter driving period, and a second electrode of the second thin film transistor is connected to a low level input terminal.

Preferably, duration of a high level signal of the rescanning signal source is the same as that of a high level signal of a clock signal in the gate driving circuit.

Preferably, the touch display screen further includes a signal circuit board, on which signal lines for providing electrical signals to the touch display screen are disposed.

As the first n scanning lines scanned in step S3 are the last n scanning lines scanned in step S1, which is equivalent to that the last n scanning lines in the former driving period are rescanned in the latter driving period. By rescanning, the level of a pull-up node of a shift register unit corresponding to the $(n+1)^{th}$ scanning line in the latter driving period (equivalent to the first scanning line in the latter driving period in the prior art) can be a high level, and the touch stage will not be experienced after the pull-up node of the shift register unit corresponding to the $(n+1)^{th}$ scanning line scanned in the latter driving period is pulled up to a high level. Therefore, the pull-up node of the shift register unit corresponding to the $(n+1)^{th}$ scanning line scanned in the latter driving period can well remain at the high level, so that a corresponding image when this scanning line is scanned can be displayed accurately. Accordingly, the images displayed by using the time division diving method provided by the present invention are consecutive.

BRIEF DESCRIPTION OF THE DRAWINGS

The drawings, constituting a part of the description, are used for providing further understanding for the present invention, and for explaining the present invention together with the following specific implementations, rather than limiting the present invention. In the drawings.

DETAILED DESCRIPTION OF THE EMBODIMENTS

The specific implementations of the present invention will be described in detail below with reference to the drawings. It should be understood that the specific implementations described herein are merely used for describing and explaining the present invention, rather than limiting the present invention.

Figure 1:
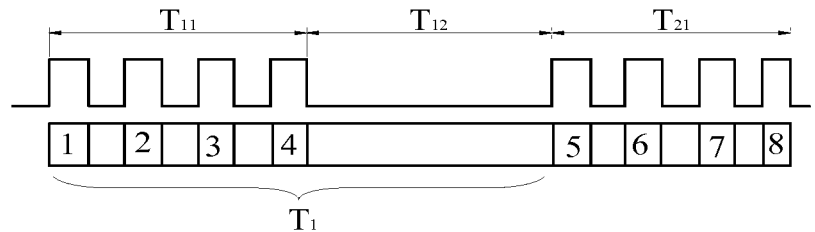
FIG. 1 is a schematic diagram of a driving period of a time division driving method in the prior art.

The inventor of the present invention has found from repeated researches that, during the driving by the time division driving method shown in FIG. 1, the reason why inconsecutive display occurs is not because the duration of a touch stage is too long, but because a pull-up node of a shift register unit corresponding to a scanning line 5 has been pulled up to a high level at the end of the former display stage $T_{11}$ and electric leakage occurs to the pull-up node of the shift register unit corresponding to the scanning line 5 after the touch stage $T_{12}$ so that the corresponding image when the scanning line 5 is scanned cannot be normally displayed and the displayed image is thus inconsecutive.

Figure 2:
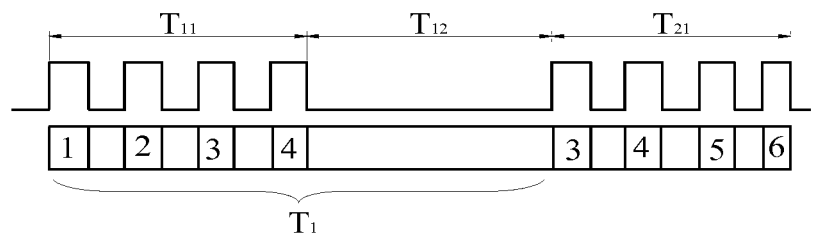
FIG. 2 is a schematic diagram of driving periods of a time division driving method provided by the present invention.

In view of the above problem, as one aspect of the present invention, there is provided a time division driving method for a touch display screen, including a plurality of driving periods, as shown in FIG. 2, for any two adjacent driving periods:

in a former driving period $T_1$ of the two adjacent driving periods, the time division driving method includes steps of:

S1: providing scanning signals to N scanning lines that are sequentially arranged in the touch display screen; and S2: stopping providing scanning signals to an array substrate of the touch display screen, and providing touch driving signals to a touch module of the touch display screen;

in a latter driving period of the two adjacent driving periods, the time division driving method includes steps of:

S3: providing scanning signals to N scanning lines that are sequentially arranged in the touch display screen; and S4: stopping providing scanning signals to the array substrate of the touch display screen, and providing touch driving signals to the touch module of the touch display screen, wherein the first n scanning lines among the N scanning lines scanned in step S3 are the last n scanning lines among the N scanning lines scanned in step S1, both N and n are positive integers and N>n; and gray-level signals of the first n scanning lines among the N scanning lines scanned in step S3 are the same as those of the last n scanning lines among the N scanning lines scanned in step S1 in one-to-one correspondence.

As shown in FIG. 2, step S1 corresponds to a display stage $T_{11}$ in the former driving period $T_1$, step S2 corresponds to a touch stage $T_{12}$ in the former driving period, step S3 corresponds to a display stage $T_{21}$ in the latter driving period, and step S4 corresponds to a touch period (not shown) in the latter driving period.

As the first n scanning lines scanned in step S3 are the last n scanning lines scanned in step S1, which is equivalent to that the last n scanning lines in the former driving period are rescanned in the latter driving period. By rescanning, level of a pull-up node of a shift register unit corresponding to the $(n+1)^{th}$ scanning line in the latter driving period (equivalent to the first scanning line in the latter driving period in the prior art) can be a high level, and the touch stage will not be experienced after the pull-up node of the shift register unit corresponding to the $(n+1)^{th}$ scanning line scanned in the latter driving period is pulled up to a high level. Therefore, the pull-up node of the shift register unit corresponding to the $(n+1)^{th}$ scanning line scanned in the latter driving period can well remain at a high level and can thus provide a strong enough scanning signal to turn on a thin film transistor connected to the scanning line completely, so that gray-level signals may be completely applied onto pixel electrodes, and a corresponding image when this scanning line is scanned can be displayed accurately. Accordingly, the images displayed by using the time division diving method provided by the present invention are consecutive.

It is easily understood that the gray-level signals of the first n scanning lines scanned in step S3 are the same as those of the last n scanning lines scanned in step S1 in one-to-one correspondence. That is, when the n scanning lines are rescanned, a source driver provides the same gray-level signals, so that the image displayed when the n scanning lines are scanned for the first time is the same as the image displayed when said n scanning lines are scanned for the second time. As the scanning frequency is high, the rescanned images cannot be recognized by human eyes. As a result, human eyes can see consecutive images.

In the present invention, the number of the scanning lines scanned each time is not specifically limited. For example, as a specific implementation of the present invention, as shown in FIG. 2, N may be 4 and n may be 2.

The implementation of the time division driving method provided by the present invention will be specifically described below with reference to FIG. 2.

In step S1, a first scanning line 1, a second scanning line 2, a third scanning line 3 and a fourth scanning line 4 are sequentially scanned. In step S2, the scanning signals provided to an array substrate of the touch display screen are stopped, and touch driving signals are provided to a touch module of the touch display screen. In step S3, the third scanning line 3 and the fourth scanning line 4 are rescanned, and a fifth scanning line 5 and a sixth scanning line 6 are then sequentially scanned. In step S4, the scanning signals provided to the array substrate of the touch display screen are stopped, and touch driving signals are provided to the touch module of the touch display screen.

Figure 3:
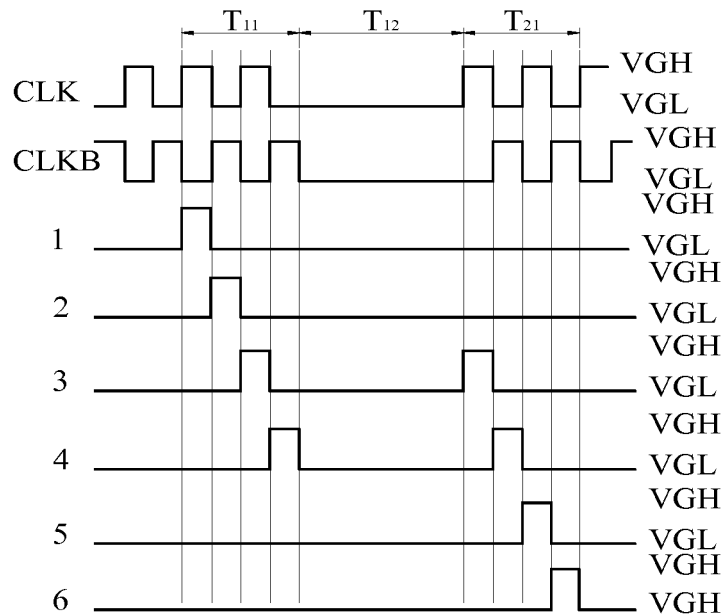
FIG. 3 is a timing diagram of a first clock signal, a second clock signal and scanning signals output by scanning lines when a touch display screen is driven by the time division driving method shown in FIG. 2.

FIG. 3 shows a timing diagram of a first clock signal CLK, a second clock signal CLKB and scanning signals output by scanning lines when a touch display screen is driven by the time division driving method shown in FIG. 2. When stopping inputting the first clock signal CLK and the second clock signal CLKB, no scanning signals will be generated.

The gray-level signals provided by the source driver when the third scanning line 3 is scanned in step S1 are the same as those provided by the source drive when the third scanning line 3 is scanned in step S3, and the gray-level signals provided by the source driver when the fourth scanning line 4 is scanned in step S1 are the same as those provided by the source driver when the fourth scanning line 4 is scanned in step S3.

As another aspect of the present invention, a touch display screen that can implement the above time division driving method is provided, each driving period of the touch display screen includes a display stage and a touch stage, and the touch display screen includes:

a gate driving circuit 200, which includes a plurality of stages of cascaded shift register units, wherein, in the display stage, N stages of shift register units are configured to provide scanning signals to N scanning lines of the touch display screen;

a source driving circuit, which is able to provide gray-level signals to data lines of the touch display screen in the display stage, wherein:

the touch display screen further includes:

a rescanning circuit 300, which, in a predetermined time period t1 before the latter driving period of the two adjacent driving periods begins, is able to pull the potential of a pull-up node of the shift register unit corresponding to the $(N-n+1)^{th}$ scanning line among the N scanning lines corresponding to the former one of the two adjacent driving periods up to a high level VGH, and pull the potential of a pull-up node of the shift register unit corresponding to the $(n+1)^{th}$ scanning line among the N scanning lines corresponding to the latter driving period down to a low level VGL, so that in the two adjacent driving periods, the last n scanning lines among the N scanning lines scanned in the former driving period are the same as the first n scanning lines among the N scanning lines scanned in the latter driving period, where both N and n are positive integers and N>n, and the predetermined time period lasts till the latter driving period begins; and gray-level signals provided by the source driving circuit while scanning the last n scanning lines in the former driving period are the same as those provided by the source driving circuit while scanning the first n scanning lines in the latter driving period in one-to-one correspondence.

It is easily understood by those skilled in the art that, the touch display screen provided by the present invention further includes a signal circuit board 100, on which signal lines for providing electrical signals such as a first clock signal CLK, a second clock signal CLKB, an initial signal STV, a ground level Vss and the like are disposed. Each stage of shift register unit corresponds to one scanning line on the array substrate of the touch display screen, and the signal output from the shift register unit is the scanning signal output by the corresponding scanning line.

Figure 5:
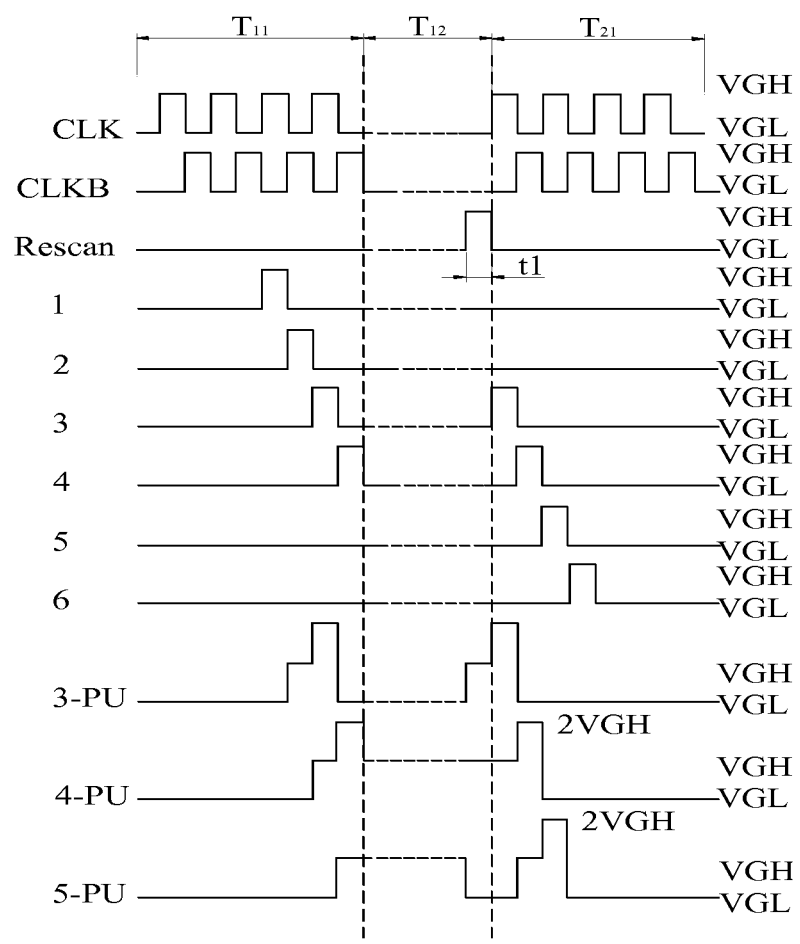
FIG. 5 is a timing diagram of control signals and signals at pull-up nodes of stages of shift register units of a touch display screen provided by the present invention.

As shown in FIG. 5, the timing sequence of the first clock signal CLK is complementary with the timing sequence of the second clock signal CLKB. That is, when the first clock signal CLK is at a high level VGH, the second clock signal CLKB is at a low level VGL, when the first clock signal CLK is at a low level VGL, the second clock signal CLKB is at a high level VGH, and the pulse width of the first clock signal CLK is the same as that of the second clock signal CLKB.

In the present invention, in the touch stage, the input of the first clock signal CLK and the second clock signal CLKB is stopped. In the predetermined time period t1 before the latter driving period begins, the rescanning circuit 300 can pull the potential of a pull-up node of the shift register unit corresponding to the $(N-n+1)^{th}$ scanning line among the N scanning lines scanned in the former driving period from a low level VGL up to a high level VGH, and pull the potential of a pull-up node of the shift register unit corresponding to the $(n+1)^{th}$ scanning line in the latter driving period down to a low level VGL.

After the potential of the pull-up node of the shift register unit corresponding to the $(N-n+1)^{th}$ scanning line among the N scanning lines scanned in the former driving period is pulled from a low level VGL up to a high level VGH, the $(N-n+1)^{th}$ scanning line among the N scanning lines scanned in the former driving period (i.e., the first scanning line among the N scanning lines scanned in the latter driving period) is rescanned after the touch stage of the former driving period ends. It should be understood that, in the prior art, after the former driving period ends, the first scanning line in the latter driving period (equivalent to the $(n+1)^{th}$ scanning line in the latter driving period in the present invention) should be scanned. In the present invention, as the potential of the pull-up node of the shift register unit corresponding to the $(n+1)^{th}$ scanning line in the latter driving period is pulled down to a low level VGL, the $(n+1)^{th}$ scanning line in the latter driving period will not be scanned.

As described above, after the n scanning lines are rescanned, the level of the pull-up node of the shift register unit corresponding to the $(n+1)^{th}$ scanning line scanned in the latter driving period (equivalent to the first scanning line in the latter driving period in the prior art) can be a high level, and the touch stage will not be experienced after the pull-up node of the shift register unit corresponding to the $(n+1)^{th}$ scanning line scanned in the latter driving period is pulled up to the high level. Therefore, the pull-up node of the shift register unit corresponding to the $(n+1)^{th}$ scanning line scanned in the latter driving period can well remain at a high level and thus may provide a scanning signal strong enough to turn on a thin film transistor connected to the scanning line completely, so that gray-level signals can be completely applied onto pixel electrodes, and a corresponding image when this scanning line is scanned can be displayed accurately. Accordingly, the images displayed by using the time division diving method provided by the present invention are consecutive.

In the present invention, N and n are not specifically limited. As a preferred implementation of the present invention, as shown in FIG. 5, N may be 4 and n may be 2.

Figure 4:
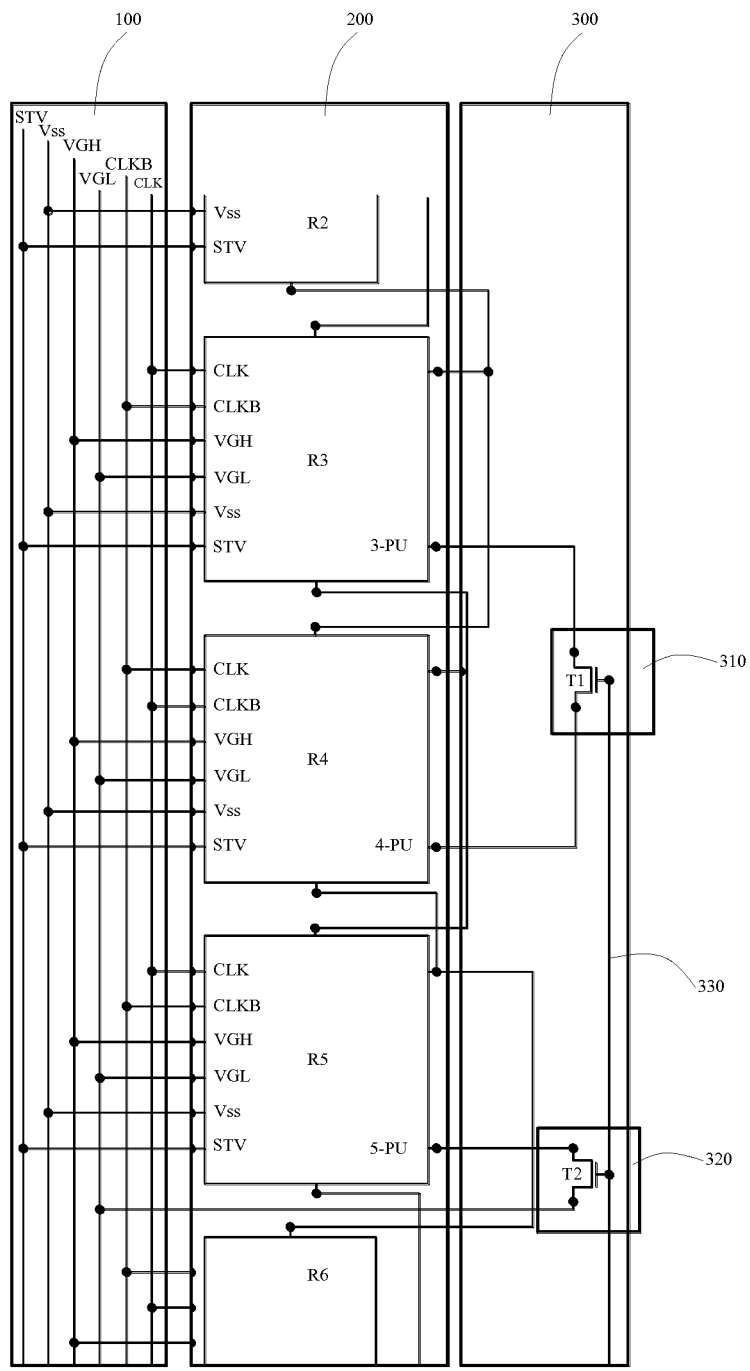
FIG. 4 is a circuit schematic diagram of a touch display screen provided by the present invention.

In the present invention, the specific structure of the rescanning circuit 300 is not particularly limited, as long as the rescanning circuit 300 can provide a corresponding level signal to the pull-up node of the corresponding shift register unit in the predetermined time period t1. A specific structure of the rescanning circuit 300 will be described as below. As shown in FIG. 4, as a preferred implementation of the present invention, the rescanning circuit 300 may include:

a rescanning signal source 330, configured to begin providing a control signal Rescan at a predetermined moment before the latter driving period of the two adjacent driving periods begins, wherein the control signal of the rescanning signal source 330 lasts till the latter driving period begins; and a plurality of rescanning control modules, to each of which 2N-n scanning lines scanned in the two adjacent driving periods correspond, and each of which is connected to the rescanning signal source, wherein when the rescanning signal source outputs the control signal Rescan, the rescanning control modules outputs a high level to the pull-up node of the shift register unit corresponding to the $(N-n+1)^{th}$ scanning line among the N scanning lines scanned in the former driving period and pulls the potential of the pull-up node of the shift register unit corresponding to the $(n+1)^{th}$ scanning line in the latter driving period down to a low level.

Herein, the rescanning signal source is used for providing the control signal Rescan so that the rescanning process becomes controllable.

For convenience of control, preferably, each rescanning control module may include:

a first control unit 310, configured to output a high level to the pull-up node of the $(N-n+1)^{th}$ stage of shift register unit among the N stages of shift register units corresponding to the former driving period when the rescanning signal source 330 provides the control signal; and a second control unit 320, configured to pull the potential of the pull-up node of the $(n+1)^{th}$ stage of shift register unit among the N stages of shift register units corresponding to the latter driving period down to a low level when the rescanning signal source 330 provides the control signal.

The first control unit 310 is configured to provide a high level signal, while the second control unit 320 is configured to provide a low level signal. By using the same control signal Rescan, the control on both the first control unit 310 and the second control unit 320 can be simultaneously realized, so that the structure of the rescanning circuit 300 can become simpler.

As a preferred implementation of the present invention, the first control unit 310 may include a first thin film transistor T1, a gate of the first thin film transistor T1 is connected to the rescanning signal source 330, a first electrode of the first thin film transistor T1 is connected to a pull-up node of the last stage of shift register unit among the N stages of shift register units corresponding to the former driving period, and a second electrode of the first thin film transistor T1 is connected to the pull-up node of the $(N-n+1)^{th}$ stage of shift register unit among the N stages of shift register units corresponding to the former driving period. It is easily understood that, the first electrode of the first thin film transistor T1 is one of the source and drain of the first thin film transistor T1, and the second electrode of the first thin film transistor T1 is the other one of the source and drain of the first thin film transistor T1.

When the rescanning signal source 330 outputs the control signal at a high level, the first thin film transistor T1 is turned on. As the pull-up node of the last stage of shift register unit among the N stages of shift register units corresponding to the former driving period outputs a high level VGH before the rescanning signal source 330 outputs the control signal at the high level, the first electrode of the first thin film transistor T1 is at the high level VGH. The first thin film transistor T1 is in a turned-on state, and therefore the level of the pull-up node of the $(N-n+1)^{th}$ stage of shift register unit among the N stages of shift register units corresponding to the former driving period can be pulled up to a high level VGH.

Similarly, the second control unit 320 may include a second thin film transistor T2, a gate of the second thin film transistor T2 is connected to the rescanning signal source 330, a first electrode of the second thin film transistor T2 is connected to the pull-up node of the $(n+1)^{th}$ stage of shift register unit among the N stages of shift register units corresponding to the latter driving period, and a second electrode of the second thin film transistor T2 is connected to a low level input terminal. It is easily understood that the scanning line corresponding to the $(n+1)^{th}$ stage of shift register unit in the latter driving period is the first scanning line scanned after the rescanning is finished. It is easily understood that, the first electrode of the second thin film transistor T2 is one of the source and drain of the second thin film transistor T2, and the second electrode of the second thin film transistor T2 is the other one of the source and drain of the second thin film transistor T2.

When the rescanning signal source 330 outputs the control signal at a high level, the second thin film transistor T2 is turned on. Before the rescanning signal source 330 outputs the control signal at the high level, the potential of the pull-up node of the $(n+1)^{th}$ stage of shift register unit among the N stages of shift register units corresponding to the latter driving period is a high level VGH. After the second thin film transistor T2 is turned on, the low level VGL of the second electrode of the second thin film transistor T2 can pull the potential of the pull-up node of the $(n+1)^{th}$ stage of shift register unit among the N stages of shift register units corresponding to the latter driving period down to the low level VGL. Therefore, after the touch stage in the former driving period ends, the scanning line corresponding to the $(n+1)^{th}$ stage of shift register unit among the N stages of shift register units corresponding to the latter driving period will not output a scanning signal, that is, the scanning line will not be scanned.

It is easily understood that the first control unit 310 including the first thin film transistor T1 and the second control unit 320 including the second thin film transistor T2 are simple in structure and easy to implement.

Generally, the duration of a high level signal of the rescanning signal source is the same as that of a high level signal of a clock signal in the gate driving circuit.

The working principle of the touch display screen shown in FIG. 4 will be described below with reference to the timing diagram shown in FIG. 5.

As shown in FIG. 4, the scanning line 2 corresponds to a shift register unit R2, the scanning line 3 corresponds to a shift register unit R3, the scanning line 4 corresponds to a shift register unit R4, the scanning line 5 corresponds to a shift register unit R5, and the scanning line 6 corresponds to a shift register unit R6.

First, in the display stage $T_{11}$ of the former driving period, the scanning lines 1 to 4 are scanned. After the scanning line 4 outputs a scanning signal, the potential of a pull-up node 3-PU of the shift register unit R3 corresponding to the scanning line 3 is a low level VGL, while the potential of a pull-up node 4-PU of the shift register unit R4 corresponding to the scanning line 4 drops from 2VGH to VGH, which is still a high level.

Then, it proceeds to the touch stage $T_{12}$ of the former driving period. In the touch stage $T_{12}$, the input of both the first clock signal CLK and the second clock signal CLKB is stopped. Therefore, the potential of the pull-up node 3-PU of the shift register unit R3 corresponding to the scanning line 3 remains at the low level VGL, and the potential of the pull-up node 4-PU of the shift register unit R4 corresponding to the scanning line 4 remains at the high level VGH. At a predetermined moment before the first touch stage $T_{12}$ ends, the rescanning circuit 300 outputs a control signal Rescan, which turns on the first thin film transistor T1 in the first control unit 310 and the second thin film transistor T2 in the second control unit 320. After the first thin film transistor T1 is turned on, the potential of the pull-up node 3-PU of the shift register unit R3 corresponding to the scanning line 3 is pulled from the low level VGL up to a high level VGH. After the second thin film transistor T2 is turned on, the potential of a pull-up node 5-PU of the shift register unit R5 corresponding to the scanning line 5 is pulled down to a low level VGL. At the end of the touch stage in the former driving period, the control signal Rescan output from the rescanning circuit 300 also jumps from the high level VGH to the low level VGL.

Subsequently, the display stage $T_{21}$ of the latter driving period begins, and the first clock signal CLK and the second clock signal CLKB are output again. As the potential of the pull-up node 3-PU of the shift register unit R3 corresponding to the scanning line 3 is the high level VGH, the scanning line 3 outputs a scanning signal at the beginning of the display stage $T_{21}$ of the latter driving period, then the scanning line 4 outputs a scanning signal, and the scanning signal output from the scanning line 4 is subsequently output to the shift register unit R5 corresponding to the scanning line 5, so that the scanning line 5 can output a scanning signal after the scanning line 4 outputs the scanning signal.

It can be understood that the foregoing implementations are merely exemplary implementations used for describing the principle of the present invention, but the present invention is not limited thereto. Those of ordinary skill in the art may make various variations and improvements without departing from the spirit and essence of the present invention, and these variations and improvements shall fall into the protection scope of the present invention.

The invention claimed is:

1. A touch display screen, a driving period of the touch display screen comprising a display stage and a touch stage, the touch display screen comprising:
    a gate driving circuit, which comprises a plurality of stages of cascaded shift register units, wherein in the display stage, N stages of shift register units are configured to provide scanning signals to N scanning lines of the touch display screen;
    a source driving circuit, which is able to provide gray-level signals to data lines of the touch display screen in the display stage, and
    a rescanning circuit, which, in a predetermined time period before a latter driving period of any two adjacent driving periods begins, is able to pull potential of a pull-up node of the shift register unit corresponding to the $(N-n+1)^{th}$ scanning line among N scanning lines corresponding to a former driving period of the two adjacent driving periods up to a high level, and pull potential of a pull-up node of the shift register unit corresponding to the $(n+1)^{th}$ scanning line among N scanning lines corresponding to the latter driving period of the two adjacent driving periods down to a low level, so that for the two adjacent driving periods, the last n scanning lines among the N scanning lines scanned in the former driving period are the same as the first n scanning lines among the N scanning lines scanned in the latter driving period, where both N and n are positive integers and N>n, and the predetermined time period lasts till the latter driving period begins;
    wherein, gray-level signals provided by the source driving circuit while scanning the last n scanning lines in the former driving period are the same as gray-level signals provided by the source driving circuit while scanning the first n scanning lines in the latter driving period in one-to-one correspondence.

2. The touch display screen according to claim 1, wherein N equals to 4 and n equals to 2.

3. The touch display screen according to claim 1, wherein the rescanning circuit comprises:
    a rescanning signal source, configured to begin providing a control signal at a predetermined moment before the latter driving period of the two adjacent driving periods begins, wherein the control signal provided by the rescanning signal source lasts till the latter driving period begins; and a plurality of rescanning control modules, to one of which 2N-n scanning lines scanned in the two adjacent driving periods correspond, and each of which is connected to the rescanning signal source, wherein when the rescanning signal source outputs the control signal, the rescanning control module outputs a high level to the pull-up node of the shift register unit corresponding to the $(N-n+1)^{th}$ scanning line among the N scanning lines scanned in the former driving period and pulls the potential of the pull-up node of the shift register unit corresponding to the $(n+1)^{th}$ scanning line among the N scanning lines scanned in the latter driving period down to a low level.

4. The touch display screen according to claim 3, wherein each rescanning control module comprises:

a first control unit, configured to output a high level to the pull-up node of the $(N-n+1)^{th}$ stage of shift register unit among the N stages of shift register units corresponding to the former driving period when the rescanning signal source provides the control signal; and a second control unit, configured to pull the potential of the pull-up node of the $(n+1)^{th}$ stage of shift register unit among the N stages of shift register units corresponding to the latter driving period down to a low level when the rescanning signal source provides the control signal.

5. The touch display screen according to claim 4, wherein the first control unit comprises a first thin film transistor, a gate of the first thin film transistor is connected to the rescanning signal source, a first electrode of the first thin film transistor is connected to a pull-up node of the last stage of shift register unit among the N stages of shift register units corresponding to the former driving period, and a second electrode of the first thin film transistor is connected to the pull-up node of the $(N-n+1)^{th}$ stage of shift register unit among the N stages of shift register units corresponding to the former driving period.

6. The touch display screen according to claim 4, wherein the second control unit comprises a second thin film transistor, a gate of the second thin film transistor is connected to the rescanning signal source, a first electrode of the second thin film transistor is connected to the pull-up node of the $(n+1)^{th}$ state of shift register unit among the N stages of shift register units corresponding to the latter driving period, and a second electrode of the second thin film transistor is connected to a low level input terminal.

7. The touch display screen according to claim 3, wherein duration of a high level signal of the rescanning signal source is the same as that of a high level signal of a clock signal in the gate driving circuit.

8. The touch display screen according to claim 4, wherein duration of a high level signal of the rescanning signal source is the same as that of a high level signal of a clock signal in the gate driving circuit.

9. The touch display screen according to claim 5, wherein duration of a high level signal of the rescanning signal source is the same as that of a high level signal of a clock signal in the gate driving circuit.

10. The touch display screen according to claim 6, wherein duration of a high level signal of the rescanning signal source is the same as that of a high level signal of a clock signal in the gate driving circuit.

11. The touch display screen according to claim 1, wherein the touch display screen further comprises a signal circuit board, on which signal lines for providing electrical signals to the touch display screen are disposed.

* * * * *